(12) United States Patent
Burgess et al.

(10) Patent No.: US 9,524,143 B2
(45) Date of Patent: Dec. 20, 2016

(54) APPARATUS AND METHOD FOR EFFICIENT DIVISION PERFORMANCE

(71) Applicant: ARM Limited, Cambridge (GB)

(72) Inventors: Neil Burgess, Austin, TX (US); David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 211 days.

(21) Appl. No.: 14/315,940

(22) Filed: Jun. 26, 2014

(65) Prior Publication Data

US 2015/0378681 A1    Dec. 31, 2015

(51) Int. Cl.
| | | |
|---|---|---|
| *G06F 7/535* | (2006.01) | |
| *G06F 9/30* | (2006.01) | |
| *G06F 7/537* | (2006.01) | |
| *G06F 5/01* | (2006.01) | |

(52) U.S. Cl.
CPC .............. *G06F 7/535* (2013.01); *G06F 5/01* (2013.01); *G06F 7/537* (2013.01); *G06F 9/3001* (2013.01)

(58) Field of Classification Search
CPC ....................................................... G06F 7/537
See application file for complete search history.

(56) References Cited

U.S. PATENT DOCUMENTS

| | | | | |
|---|---|---|---|---|
| 5,574,677 | A | * | 11/1996 | Cohen ................. G06F 7/535 708/552 |
| 6,021,487 | A | | 2/2000 | Maliszewski |
| 6,321,245 | B1 | | 11/2001 | Cukier et al. |
| 2002/0111976 | A1 | | 8/2002 | Hossain |
| 2002/0161811 | A1 | | 10/2002 | Hong |
| 2003/0128799 | A1 | | 7/2003 | Clausen et al. |
| 2004/0098441 | A1 | | 5/2004 | Kishore et al. |
| 2004/0098442 | A1 | | 5/2004 | Kishore et al. |

(Continued)

FOREIGN PATENT DOCUMENTS

| | | | | |
|---|---|---|---|---|
| JP | 3-15942 | | 1/1991 | |
| JP | H0315942 | * | 1/1991 | ............. G06F 7/483 |

OTHER PUBLICATIONS

So, Hayden, Introduction to Fixed Point Number Representation, Feb. 28, 2006, pp. 1-5.*

(Continued)

*Primary Examiner* — Andrew Caldwell
*Assistant Examiner* — Calvin M Brien
(74) *Attorney, Agent, or Firm* — Nixon & Vanderhye P.C.

(57) ABSTRACT

A data processing apparatus and method of operating such a data processing apparatus are provided, for responding to a division instruction to perform a division operation to generate a result value by dividing an input numerator specified by the division instruction by an input denominator specified by the division instruction. The input numerator and input denominator are binary values. The apparatus comprises division circuitry configured to generate the result value by carrying out the division operation, power-of-two detection circuitry configured to signal a bypass condition if the input denominator has a value given by $\pm 2^N$, where N is a positive integer, and bypass circuitry configured, in response to signalling of the bypass condition, to cause the division circuitry to be bypassed and to cause the result value to be generated as the input numerator shifted by N bits.

19 Claims, 10 Drawing Sheets

(56) References Cited

U.S. PATENT DOCUMENTS

| | | |
|---|---|---|
| 2004/0117423 A1 | 6/2004 | Shi et al. |
| 2004/0167956 A1 | 8/2004 | Vihriala |
| 2006/0094973 A1 | 5/2006 | Drew |
| 2006/0179092 A1 | 8/2006 | Schmookler |
| 2014/0222884 A1* | 8/2014 | Gupta ..................... G06F 7/535 |
| | | 708/650 |

OTHER PUBLICATIONS

Wikipedia, Two's Complement, May 24, 2013, pp. 1-9.*
Wikipedia, Arithmetic Shift, Mar. 8, 2013, pp. 1-4.*
UK Combined Search and Examination Report issued Nov. 16, 2015 in GB 1508808.1, 6 pages.

* cited by examiner

APPARATUS AND METHOD FOR EFFICIENT DIVISION PERFORMANCE

BACKGROUND

The present invention relates to the field of data processing systems. More particularly, this invention relates to data processing systems configured to be responsive to a division instruction to perform a division operation.

It is known to provide data processing systems which are responsive to a division instruction to perform a division operation. Such data processing systems are configured to be responsive to a division instruction which specifies a numerator and a denominator, and to perform the division operation to generate the result of dividing the numerator by the denominator. Such data processing systems are typically provided with dedicated division circuitry configured to carry out the division. For example, dedicated integer division circuitry may be provided configured to carry out an integer division in response to an integer division instruction.

SUMMARY

Viewed from a first aspect, the present invention provides apparatus for data processing configured to respond to a division instruction to perform a division operation, wherein the division operation is arranged to generate a result value by dividing an input numerator specified by the division instruction by an input denominator specified by the division instruction, wherein the input numerator and input denominator are binary values, the apparatus comprising: division circuitry configured to generate the result value by carrying out the division operation; and power-of-two detection circuitry configured to signal a bypass condition if the input denominator has a value given by $\pm 2^N$, where N is an integer; and bypass circuitry configured, in response to signalling of the bypass condition, to cause the division circuitry to be bypassed and to cause the result value to be generated as the input numerator shifted by N bits.

The present technique recognises that a division operation can be a relatively costly operation for a data processing system to perform (i.e. in terms of the time and energy expended). Further, the present technique recognises that the cost of operating dedicated division circuitry can be avoided in situations where the denominator is a power of two, since in this situation the division result can be returned very quickly by shifting the numerator by N bit positions, where the denominator may be represented as $\pm 2^N$. This will typically (though not always, see below) be a right shift of the numerator. Thus, in the situation where the denominator is indeed a power of two, the cost of operating the division circuitry may be avoided by bypassing the division circuitry (for example, by means of a signal to the division circuitry causing it to cease further activity in response to the division instruction) and to output the result value generated as described above by shifting the input numerator.

The power-of-two detection circuitry may be configured in a number of ways, but in some embodiments the power-of-two detection circuitry comprises exclusive bit detection circuitry configured to signal the bypass condition if the input denominator has only one bit set whilst all other bits are unset. Since the input numerator and input denominator are binary values, only having one bit set is indicative (at least for an unsigned binary value or a positive signed binary value) of the fact that the input denominator is a power of two (i.e. the input denominator can be represented as $2^N$, where the one bit which is set is the $N^{th}$ bit of the input denominator, numbering the bits of the input denominator from 0 from the least significant bit). It should be noted that the "setting" of a bit will commonly be the act of giving that bit a value of 1, though it will also be recognised that the choice of the value 1 to represent a "set" bit is arbitrary and could be substituted by 0. The present techniques are not limited to one representation or the other, although are described in terms of a set bit having a value of 1, in accordance with this common convention.

In some embodiments the bypass circuitry is configured to cause the result value to be generated as the input numerator shifted by a number of unset bits which follow the one bit set in the input denominator. Thus, the number of bit positions by which the input numerator should be shifted to generate the result value can be determined from the number of unset bits which follow (i.e. are at lower significant bit positions than) the one bit which has been found to be set by the exclusive bit detection circuitry.

It may be the case in a data processing apparatus which comprises division circuitry that leading zero determination circuitry is also provided, since a leading zero count of the two operands (numerator and denominator) may be used in a number of ways in relation to the division circuitry, for example, where the division circuitry is configured to left shift both operands by their respective leading zero counts in order to align their respective most significant set bits. The data processing apparatus may also be configured to determine the difference between the two leading zero counts, and so on.

Accordingly, in some embodiments comprising leading zero determination circuitry configured to determine a leading zero count of the input denominator, the power-of-two detection circuitry is configured to determine N from the leading zero count of the input denominator by inverting a binary representation of the leading zero count. This is best illustrated by an example. If the denominator is 00010000 binary, the leading zero count is 3, which is 011. Inverting this binary representation of the leading zero count gives 100 binary, which is 4. So N is the fourth bit, numbering the bits of the denominator from zero from the least significant bit. Hence, use may be made of the pre-existing leading zero determination circuitry to determine N.

It should be noted that this method is only suitable for $2^A$-bit binary values, where A is an integer, e.g. 8-bit, 16-bit and 32-bit binary values.

It should also be noted that for this method to work, the binary representation of the leading zero count should be an A-bit value. That is, in the example above, the denominator is an 8-bit value, so A=3 ($2^3$=8). The binary representation of the leading zero count should therefore be a 3-bit value (A=3).

However, in embodiments in which such leading zero determination circuitry is not provided, it may be preferable to determine N more directly as a trailing zero count and accordingly some embodiments comprise trailing zero determination circuitry configured to determine a trailing zero count of the input denominator, wherein the power-of-two detection circuitry is configured to determine N as the trailing zero count of the input denominator.

The exclusive bit detection circuitry may be configured in a number of ways, but in some embodiments the exclusive bit detection circuitry comprises plural binary trees of gates, each binary tree of gates comprising a plurality of hierarchical levels, wherein one hierarchical level of each binary tree comprises XOR gates whilst all other hierarchical levels of each binary tree comprise OR gates, and each binary tree of the plural binary trees has its XOR gates at a different hierarchical level to the other binary trees of the plural binary trees, and an AND combination of outputs of the plural binary trees is indicative of the bypass condition. Such an arrangement of XOR gates and OR gates (which should be understood to correspond to their logical function here and may therefore be implemented by any combination of logic gates which together provide XOR and OR gate functionality respectively) thus enables a determination to be made of whether the input denominator comprises only one bit which is set, by virtue of the fact that each binary tree will be configured to indicate whether an exclusive bit has been found at a different respective level of granularity within the input denominator, i.e. whether a bit has been found which is exclusive with respect to its neighbouring position, whether the assertion of one or more bits in a pair of bits have a neighbouring pair of bits which are unset, whether a set of four bits having at least one bit set are neighboured by a set of four bits unset and so on. Hence combining these conditions (for example via a final AND gate) allows the determination of whether only one bit is exclusively set in the whole of the input denominator.

In some embodiments the exclusive bit detection circuitry comprises a network of logic gates, the network of logic gates configured to take the input denominator as a test value and to:

A) perform a determination of whether no bits are set in a first half of the bits of the test value and at least one bit is set in a second half of the bits of the test value, and if the determination is true, to:

B) take the second half of the bits of the test value as the test value and repeat the determination at A), until the second half of the bits of the test value is only one bit, and if this one bit is set to signal the bypass condition.

Thus, an iterative process may be performed by looking at each half of the input denominator to determine if only one of those halves contains any set bits, and the half with the set bins) then being split into two halves for consideration at the next iteration of the process. Once only single bits are being considered, it can finally be determined if the input denominator contains only one bit which is set.

The input numerator and input denominator may be unsigned binary values.

In some embodiments the input numerator and input denominator are signed binary values using two's complement representation. Due to the difference in representation between positive signed binary values and negative signed values, the present technique recognises that whilst it would be possible for dedicated power-of-two detection circuitry to be provided for the positive signed binary values and dedicated power-of-two detection circuitry for the negative signed binary values, or indeed more complex power-of-two detection circuitry able to handle either polarity of signed binary value, a more efficient configuration is provided if one of the representations can be adapted such that the same power-of-two detection circuitry can be used for both. Accordingly in some embodiments the input numerator and input denominator are signed binary values and the power-of-two detection circuitry comprises pre-processing circuitry configured to pre-process the input denominator to generate a pre-processed input denominator if the input denominator has a negative value, and the power-of-two detection circuitry is configured to detect the bypass condition if the pre-processed input denominator represents a power of two.

The pre-processing may take a variety of forms, but in some embodiments, the pre-processing circuitry is configured to left shift the input denominator by one bit and append an unset bit as a least significant bit to generate an intermediate value, and is configured to XOR the intermediate value with the input denominator to generate the pre-processed input denominator. This configuration advantageously generates the pre-processed input denominator with a bit set at the same bit position as the positive equivalent of this negative valued input denominator. Whilst it would also be possible to generate a positive equivalent of the input denominator this process typically comprises bit inverting the input value and adding one, which may result in carry operations being required which can make this implementation more costly.

Accordingly, in some embodiments the power-of-two detection circuitry is configured to detect a bypass condition if the pre-processed input denominator has only one bit set whilst all other bits are unset. Nevertheless, it may be determined in some implementations that generating a positive equivalent of the input denominator is worthwhile, for example because this value has already been determined for other reasons and accordingly in some embodiments the pre-processing circuitry is configured to generate a positive equivalent of the input denominator as the pre-processed input denominator.

The generation of a positive equivalent may be provided in a variety of ways, but in some embodiments the pre-processing circuitry is configured to invert the bits of the input denominator and add one to generate the pre-processed input denominator.

The input numerator and input denominator may take a number of different forms. For example in some embodiments the input numerator and input denominator are binary integers. In such an embodiment the apparatus may thus be configured to respond to an integer division instruction to perform an integer division operation, and the apparatus may comprise integer division circuitry configured to generate the result value by carrying out the integer division operation. In other embodiments the input numerator and input denominator are fixed-point binary values. In such an embodiment the apparatus may thus be configured to respond to a fixed-point division instruction to perform a fixed-point division operation, and the apparatus may comprise fixed-point division circuitry configured to generate the result value by carrying out the fixed-point division operation.

Generally the shift required to perform the division operation will be a right shift, that is, where N is positive. Accordingly the bypass circuitry may be configured, when the power-of-two detection circuitry indicates that N is a positive integer, to cause the result value to be generated as the input numerator right shifted by N bits. However the present techniques recognise that where the input numerator and input denominator are fixed-point binary values, the possibility exists for the input denominator to be represented by $\pm 2^N$, where N is a negative integer (for example where the input denominator is $0.5=2^{-1}$) and this requires a left shift to generate the result value. Accordingly the bypass circuitry may be configured, when the power-of-two detection circuitry indicates that N is a negative integer, to cause the result value to be generated as the input numerator left shifted by N bits.

In some embodiments the apparatus further comprises result modification circuitry configured, when the bypass condition is signalled and N is positive, to identify a truncation condition if right shifting the input numerator by N bits to generate the result value has removed at least one set bit and, when the truncation condition is true, to cause a set least significant bit value to be added to the result value. The present techniques further recognise that when generating the result value by right shifting the numerator, an improved approach to rounding the result value may be provided by enabling the apparatus to add a set least significant bit value (i.e. add a "1" in a typical configuration) to the result value. This is of benefit when the right shift has removed at least one set bit, because it has been found that this can cause positive and negative result values to be rounded differently.

The particular configuration of the apparatus with respect to rounding will determine the conditions under which the "1" should be added. For example where the apparatus is configured to round result values towards zero, the result modification circuitry may be configured to require that the result value is negative to identify the truncation condition to be true. Alternatively where the apparatus is configured to round result values away from zero, the result modification circuitry may be configured to require that the result value is positive to identify the truncation condition to be true.

In some embodiments, the apparatus further comprises overflow detection circuitry configured, when the bypass condition is signalled and N is negative, to identify an overflow condition if left shifting the input numerator by N bits to generate the result value has removed at least one set bit and, when the overflow condition is true, to cause an overflow response to be carried out.

The overflow response may advantageously comprise causing an overflow flag to be set and/or setting the result value to a maximum magnitude available for the numerator.

Viewed from a second aspect the present invention provides a method of operating a data processing apparatus configured to perform a division operation using division circuitry, wherein the division operation is arranged to generate a result value by dividing an input numerator by an input denominator, wherein the input numerator and input denominator are binary values, the method comprising the steps of: receiving a division instruction which specifies the input numerator and the input denominator; signalling a bypass condition if the input denominator has a value given by $\pm 2^N$, where N is an integer; in the absence of the bypass condition, generating the result value by carrying out the division operation using the division circuitry; and in the presence of the bypass condition, causing the division circuitry to be bypassed and generating the result value as the input numerator shifted by N bits.

Viewed from a third aspect the present invention provides an apparatus for data processing configured to respond to a division instruction to perform a division operation using division circuitry, wherein the division operation is arranged to generate a result value by dividing an input numerator specified by the division instruction by an input denominator specified by the division instruction, wherein the input numerator and input denominator are binary values, the apparatus comprising: means for receiving a division instruction which specifies the input numerator and the input denominator; means for signalling a bypass condition if the input denominator has a value given by $\pm 2^N$, where N is an integer; means for, in the absence of the bypass condition, generating the result value by carrying out the division operation; means for, in the presence of the bypass condition, causing the means for generating the result value to be bypassed; and means for, in the presence of the bypass condition, generating the result value as the input numerator shifted by N bits.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
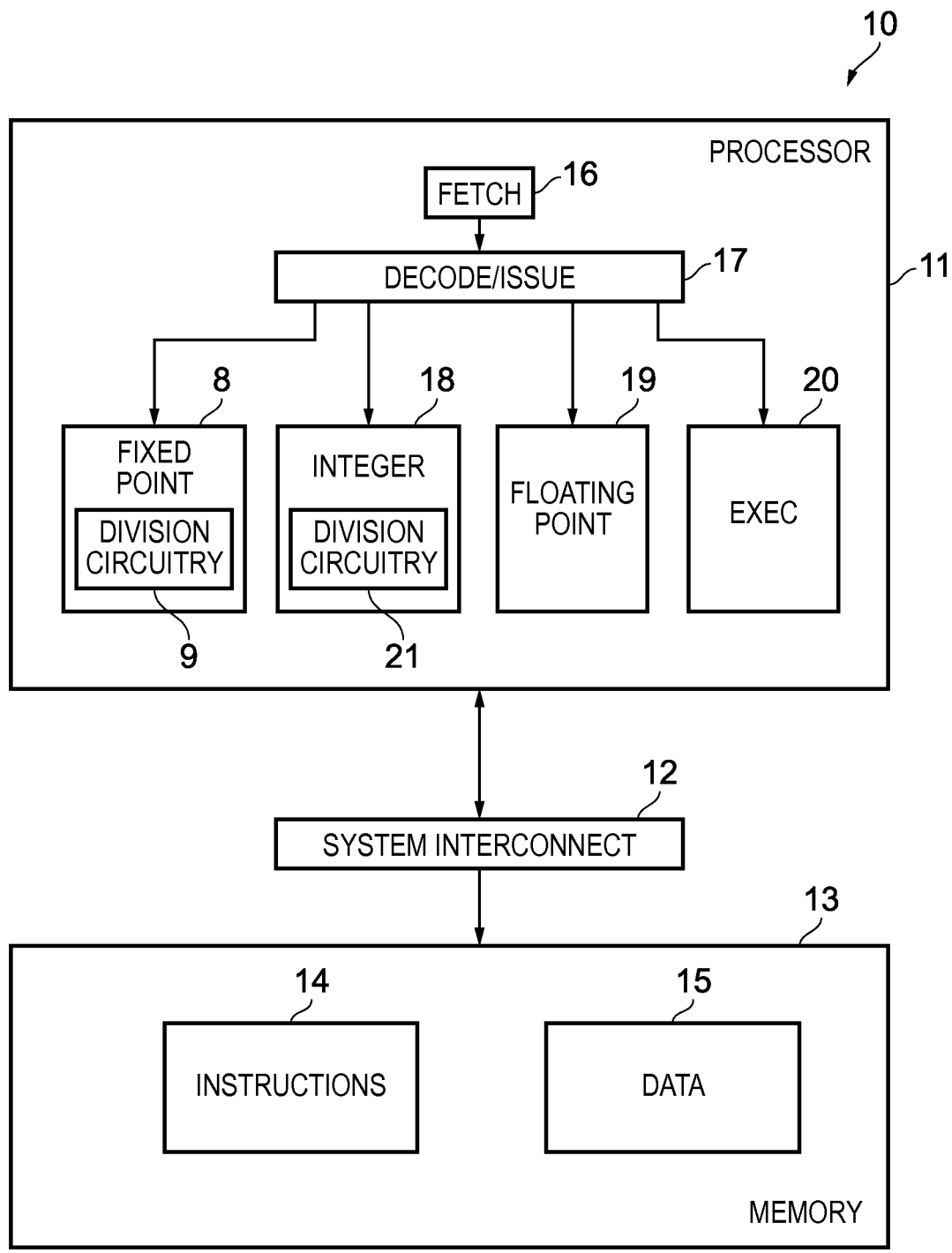
FIG. 1 schematically illustrates a data processing system which comprises a fixed-point execution pipeline comprising a fixed-point division circuit and an integer execution pipeline comprising an integer division circuit in one embodiment.

FIG. 1 schematically illustrates a data processing system 10 including a processor 11 and a memory 13. The processor is configured to access content of the memory 13 via the system interconnect 12. The memory stores program instructions 14 which configure the data processing operations performed by the processor 11, and data 15 on which those data processing operations are carried out. The processor 11 performs its data processing operations, as specified by the program instructions 14, by means of a processing pipeline which (as schematically illustrated in FIG. 1) includes a fetch stage 16, a decode and issue stage 17 and a number of different execution pipelines 8, 18, 19 and 20. The execution pipelines include a fixed-point pipeline 8, an integer pipeline 18, a floating point pipeline 19 and a general purpose execution pipeline 20. The present techniques are related to the fixed-point pipeline 8, which comprises fixed-point division circuitry 9, and integer pipeline 18 which comprises integer division circuitry 21. A fixed-point division instruction retrieved from the instructions 14 stored in memory 13 configures the fixed-point pipeline 8 to perform a fixed-point division operation using a fixed-point numerator and a fixed-point denominator specified in the fixed-point division instruction. Similarly, an integer division instruction retrieved from the instructions 14 stored in memory 13 configures the integer pipeline 18 to perform an integer division operation using an integer numerator and an integer denominator specified in the integer division instruction.

Figure 2A:
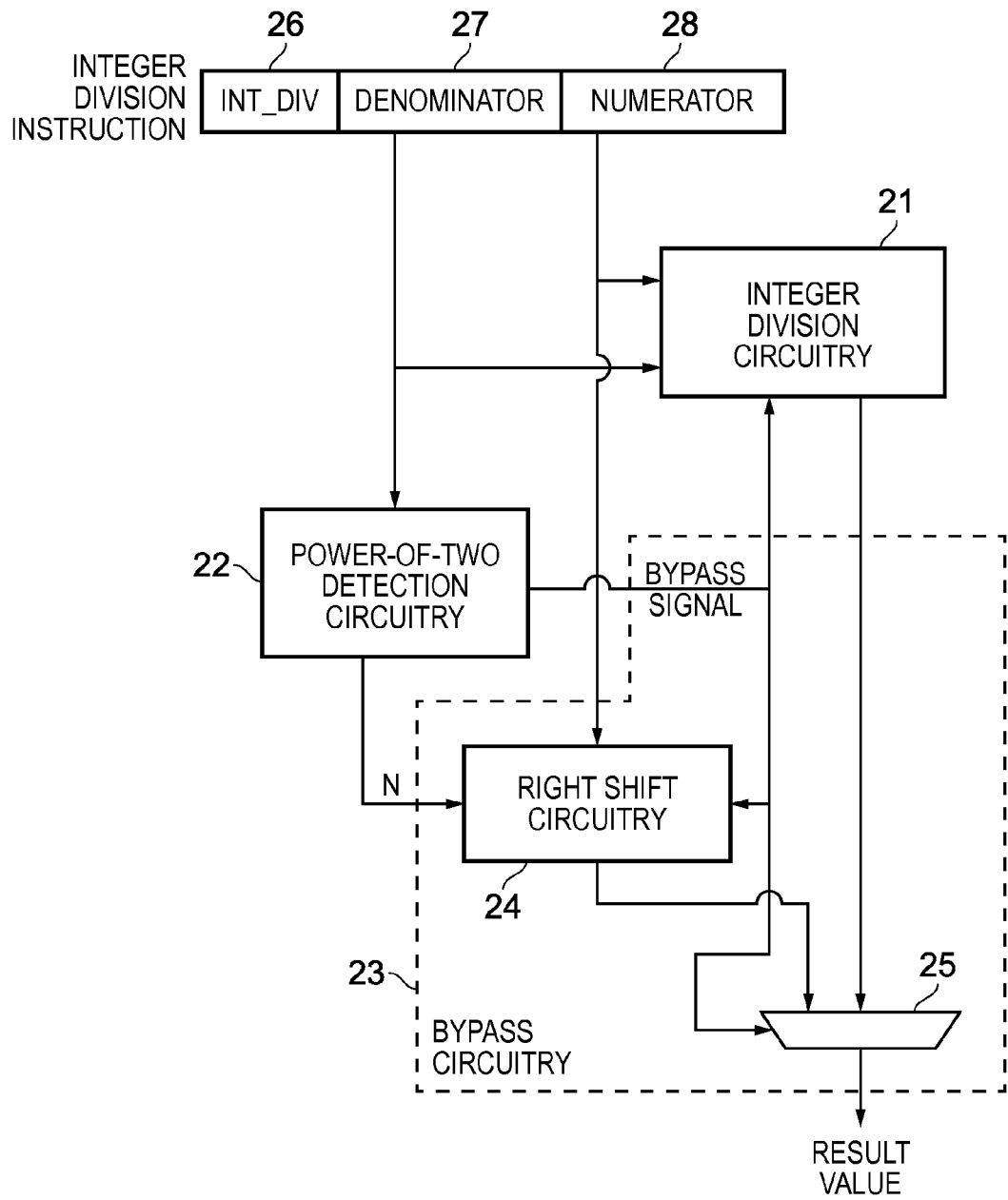
FIG. 2A schematically illustrates integer division circuitry with associated power-of-two detection circuitry and bypass circuitry in one embodiment.

FIG. 2A schematically illustrates integer division circuitry 21 together with further circuitry provided by the present techniques in one embodiment. Here, these additional components comprise the power-of-two detection circuitry 22 and the bypass circuitry 23. The bypass circuitry 23 comprises right shift circuitry 24 and multiplexer 25. FIG. 2A also schematically illustrates an integer division instruction which has an opcode 26, indicating that this is an integer division instruction (and may further indicate whether this is a signed or unsigned integer division instruction), an indication of the denominator 27 and an indication of the numerator 28. The denominator 27 and numerator 28 may for example be stored as data values in the data portion 15 of the memory 13.

In operation, the denominator 27 and numerator 28 are provided to the integer division circuitry 21 such that it may carry out its integer division operation. However, the denominator 27 is also provided to the power-of-two detection circuitry 22, which is configured to determine if the integer denominator 27 is a power of two, i.e. can be represented as $\pm 2^N$, where N is a positive integer. When this is the case, the power-of-two detection circuitry 22 outputs the corresponding value of N to the right shift circuitry 24 and also outputs a bypass signal. This bypass signal is provided to the integer division circuitry 21 and prevents it from carrying out any further part of the integer division operation. The right shift circuitry 24 receives the integer numerator 28 and right shifts this value by a number of bit positions given by N, as received from power-of-two detection circuitry 22. The result of this right shift is then provided to the multiplexer 25, the other input of which is the normal result value generated by the integer division circuitry 21. The bypass signal generated by the power-of-two detection circuitry 22 is used as the selection signal for this multiplexer 25 such that when the bypass signal is not asserted, the normal output result of the integer division circuitry 21 is used as the result value, whereas when the bypass signal is asserted, the value generated by the right shift operation performed by the right shift circuitry 24 is used as the result value.

Figure 2B:
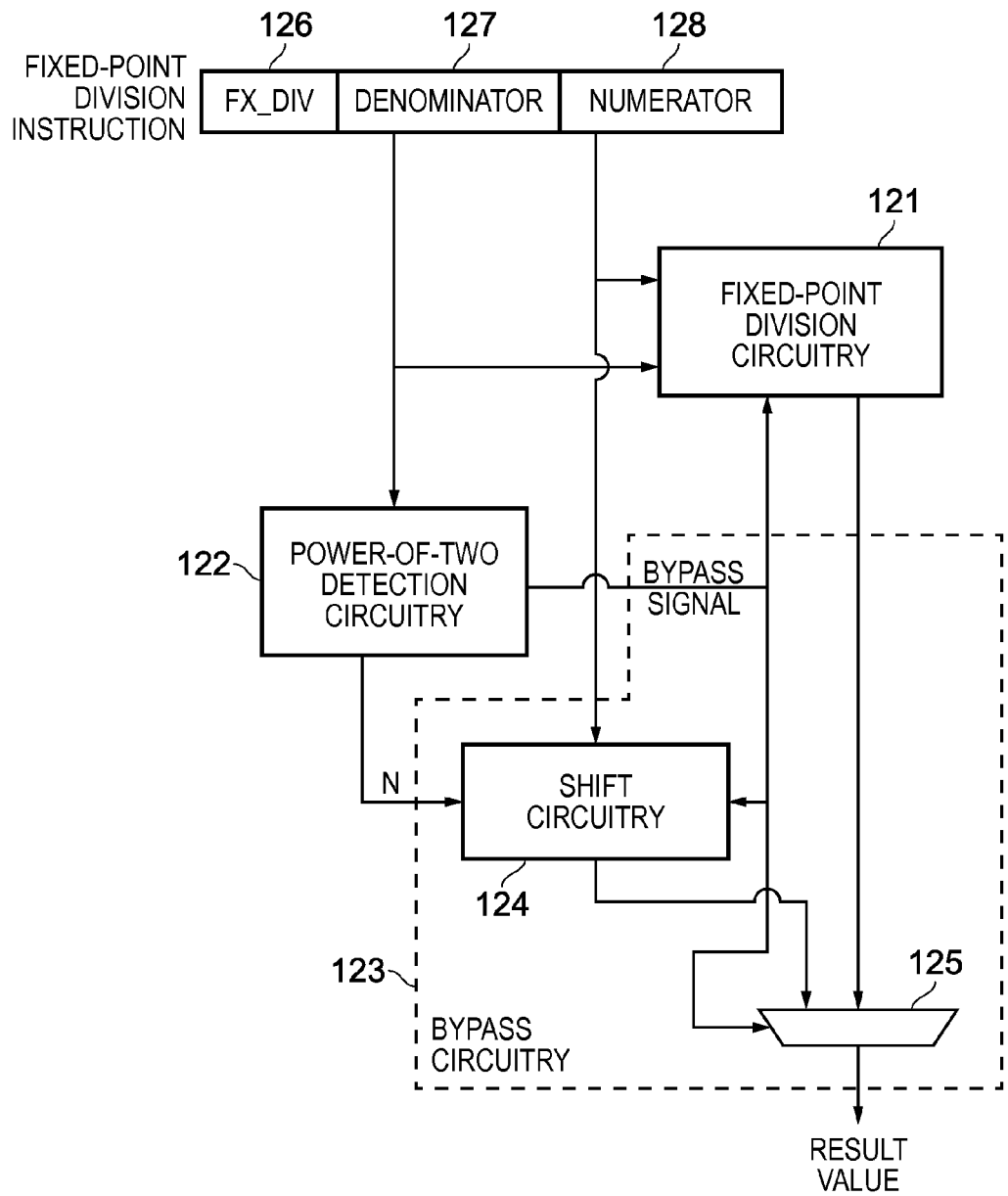
FIG. 2B schematically illustrates fixed-point division circuitry with associated power-of-two detection circuitry and bypass circuitry in one embodiment.

FIG. 2B schematically illustrates fixed-point division circuitry 121 together with further circuitry provided by the present techniques in one embodiment. Here, these additional components comprise the power-of-two detection circuitry 122 and the bypass circuitry 123. The bypass circuitry 123 comprises shift circuitry 124 and multiplexer 125. FIG. 2B also schematically illustrates a fixed-point division instruction which has an opcode 126, indicating that this is a fixed-point division instruction (and may further indicate whether this is a signed or unsigned fixed-point division instruction), an indication of the denominator 127 and an indication of the numerator 128. The denominator 127 and numerator 128 may for example be stored as data values in the data portion 15 of the memory 13.

In operation, the denominator 127 and numerator 128 are provided to the fixed-point division circuitry 121 such that it may carry out its fixed-point division operation. However, the denominator 127 is also provided to the power-of-two detection circuitry 122, which is configured to determine if the fixed-point denominator 127 is a power of two, i.e. can be represented as $\pm 2^N$, where N is an integer. When this is the case, the power-of-two detection circuitry 122 outputs the corresponding value of N to the shift circuitry 124 and also outputs a bypass signal. This bypass signal is provided to the fixed-point division circuitry 121 and prevents it from carrying out any further part of the fixed-point division operation. It will be noted that the shift circuitry 124 is not only right shift circuitry (as in the case of right shift circuitry 24 in FIG. 2A), since when working with fixed-point values the possibility exists for the input denominator to be equivalent to a negative power of 2 (for example where the input denominator is $0.5=2^{-1}$) and this requires a left shift of the input numerator. Hence the shift circuitry 124 is configured to determine the sign of N and to left shift or right shift as appropriate. The shift circuitry 124 receives the fixed-point numerator 128 and shifts this value by a number of bit positions given by N, as received from power-of-two detection circuitry 122. The result of this shift is then provided to the multiplexer 125, the other input of which is the normal result value generated by the fixed-point division circuitry 121. The bypass signal generated by the power-of-two detection circuitry 122 is used as the selection signal for this multiplexer 125 such that when the bypass signal is not asserted, the normal output result of the fixed-point division circuitry 121 is used as the result value, whereas when the bypass signal is asserted, the value generated by the shift operation performed by the shift circuitry 124 is used as the result value.

Figure 3A:
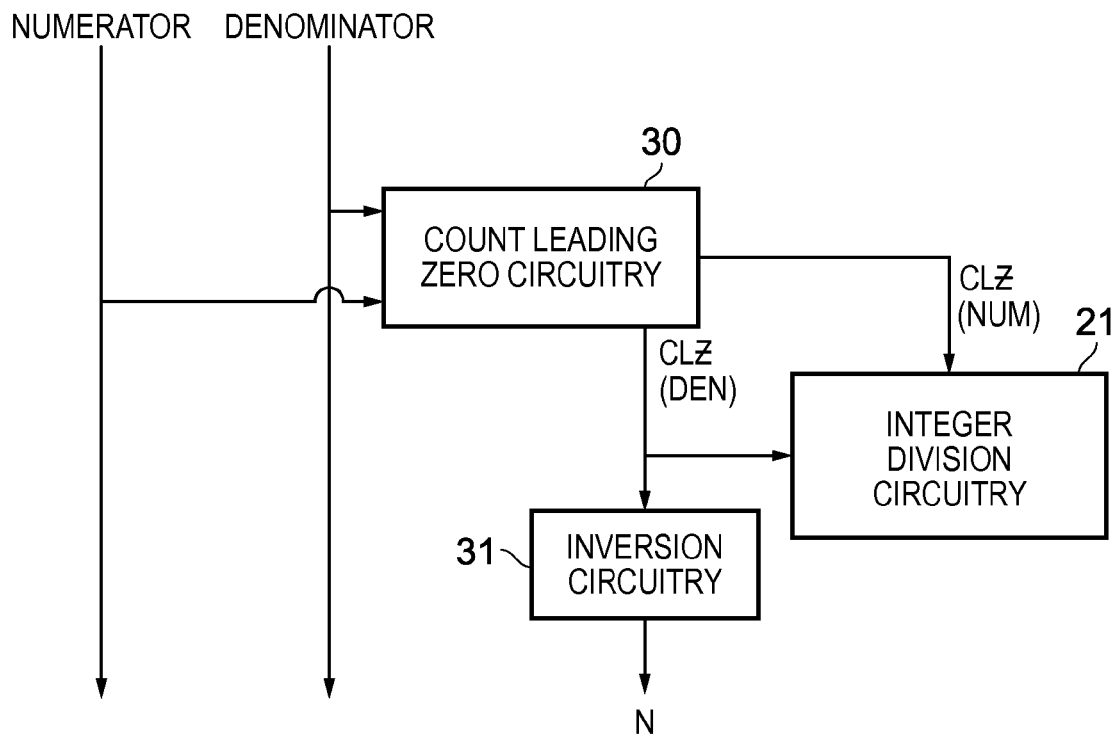
FIG. 3A schematically illustrates the determination of the positive integer N when the input denominator can be represented as $2^N$, from the output of leading zero determination circuitry in one embodiment.

FIG. 3A schematically illustrates how the power-of-two value N is generated in one embodiment. In this embodiment, the data processing apparatus comprises count leading zero (CLZ) circuitry 30 which is configured to provide the integer division circuitry 21 (see FIG. 2A) with the leading zero counts for the numerator CLZ (NUM) and denominator CLZ (DEN) respectively. The integer division circuitry 21 makes use of these values in performing its integer division operation. One of ordinary skill in the art is familiar with the use of such leading zero counts in integer division and further description of this aspect is not provided here for brevity. As shown in FIG. 3A, inversion circuitry 31 is also provided which receives the leading zero count for the denominator generated by the CLZ circuitry 30 and inverts the bits of this value to generate N. As such, in the context of the embodiment schematically illustrated in FIG. 2A, it will be understood that the CLZ circuitry 30 and the inversion circuitry 31 can be considered to form part of the power-of-two detection circuitry 22, however this is not essential, and these may be provided as part of the integer division circuitry 21, or as separate parts of the data processing apparatus.

Figure 3B:
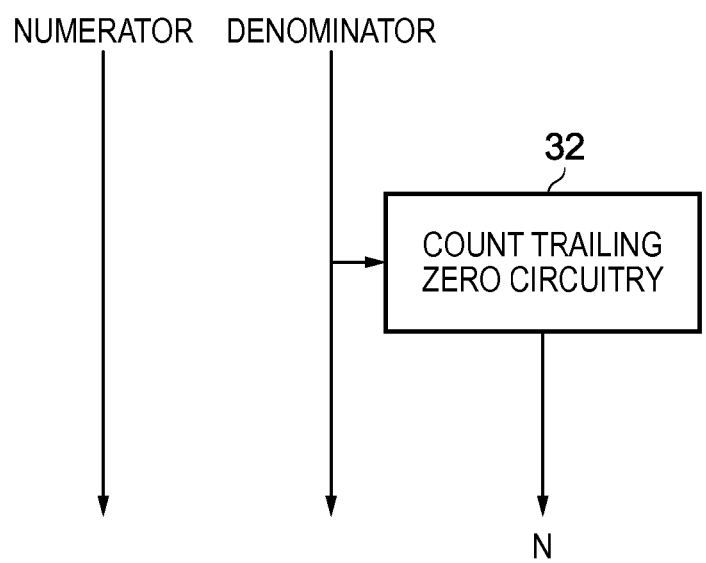
FIG. 3B schematically illustrates the determination of the positive integer N when the input denominator can be represented as $2^N$, from the output of trailing zero determination circuitry in one embodiment.

FIG. 3B schematically illustrates an alternative configuration in which count trailing zero circuitry 32 is provided, which enables the integer value N to be determined directly from the trailing zero count of the integer denominator value.

Figure 4A:
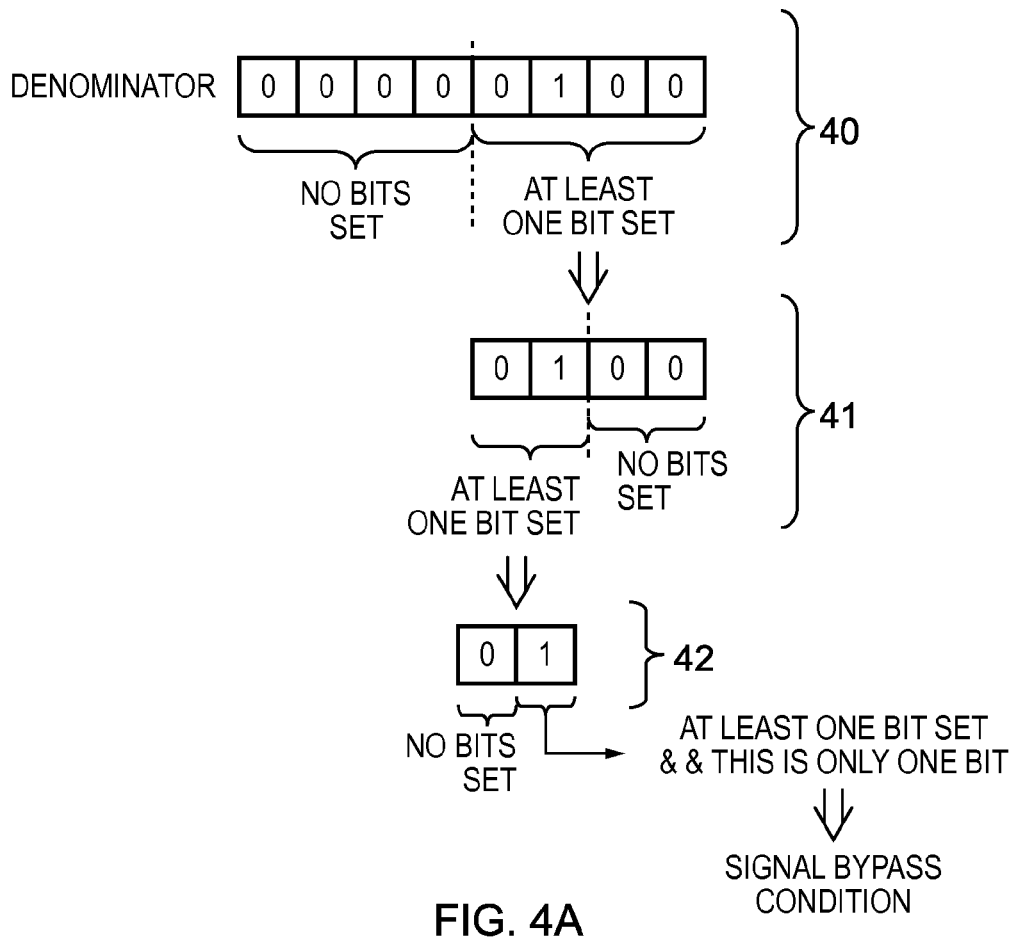
FIG. 4A schematically illustrates an iterative process by which it, may be determined that the input denominator comprises only one set bit in one embodiment.

FIG. 4A schematically illustrates an iterative process by which it may be determined if the denominator only has one bit set with all other bits being unset. The denominator is considered in two halves at a first stage 40 where it is determined if no bits are set in one half, whilst at least one bit is set in the other half. The half in which at least one bit is set is then taken forward for consideration at a second stage 41 at which the same determination is made, i.e. if no bits are set in one half, whilst at least one bit is set in the other half. This being true then the half in which at least one bit is set is taken forward to a next stage 42 at which it is determined if no bits are set in one half whilst at least one bit is set in the other half. This iterative process may be continued to other further stages for denominator values of greater bit length, but if a final stage (such as stage 42) is reached at which the "half" in which at least one bit is set is also only a single bit then the exclusive bit condition has been found and the bypass condition can be signalled on this basis.

Figure 4B:
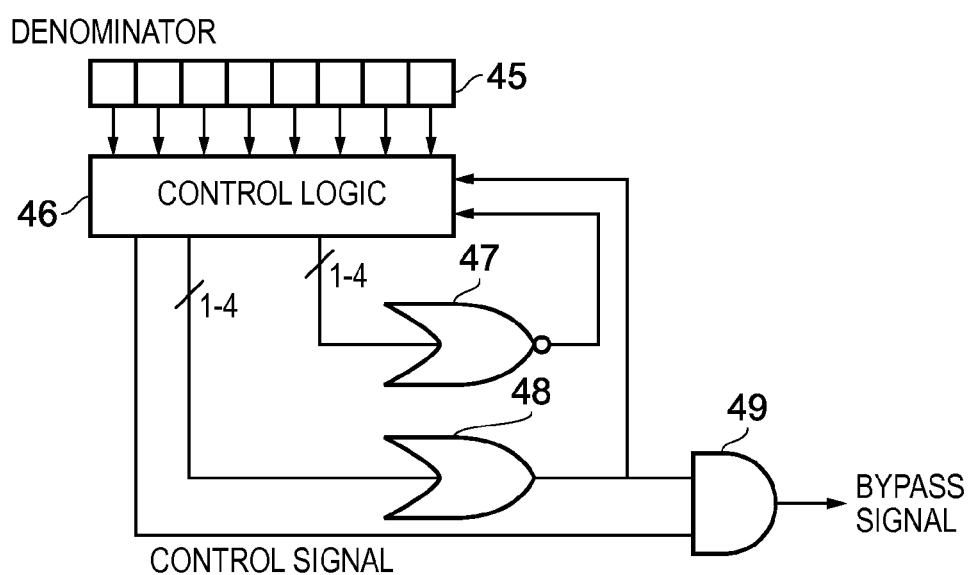
FIG. 4B schematically illustrates an arrangement of logic gates which may be used to implement the iterative process shown in FIG. 4A.

FIG. 4B schematically illustrates logic gates which may be used to implement the iterative process shown in FIG. 4A. Here, the denominator value 45 is passed to control logic 46 which is configured to divide the denominator value into two halves and to provide one half as the input to a NOR gate 47 and to provide the other half as the input to an OR gate 48. The output of NOR gate 47 and OR gate 48 are passed back to control logic 46. On the basis of these inputs the control logic can determine if the required condition has been met to pass to a subsequent level of the procedure described with reference to FIG. 4A, namely that no bits are set in the one half (i.e. the output of NOR gate 47 is one) whilst at least one bit is set in the other half (i.e. the output of OR gate 48 is one). Note that at each iteration the control logic 46 is configured to try both halves of the value through each of the gates 47 and 48 respectively. If neither permutation generates the required result, then the process is stopped and it is determined that the denominator 45 does not contain only one bit set. However, when the required condition is met, the half of the value which had been provided to the OR gate 48 is then split in half, one half being provided to the NOR gate 47 and one half being provided to the OR gate 48. The iterative process continues as described with reference to FIG. 4A. When the control logic 46 determines that only a single bit is being tested by each of the logic 47 and 48, it activates a control signal such that the output of the OR gate 48, in combination with the control signal, (forming the inputs to AND gate 49) can provide the bypass signal.

Figure 5:
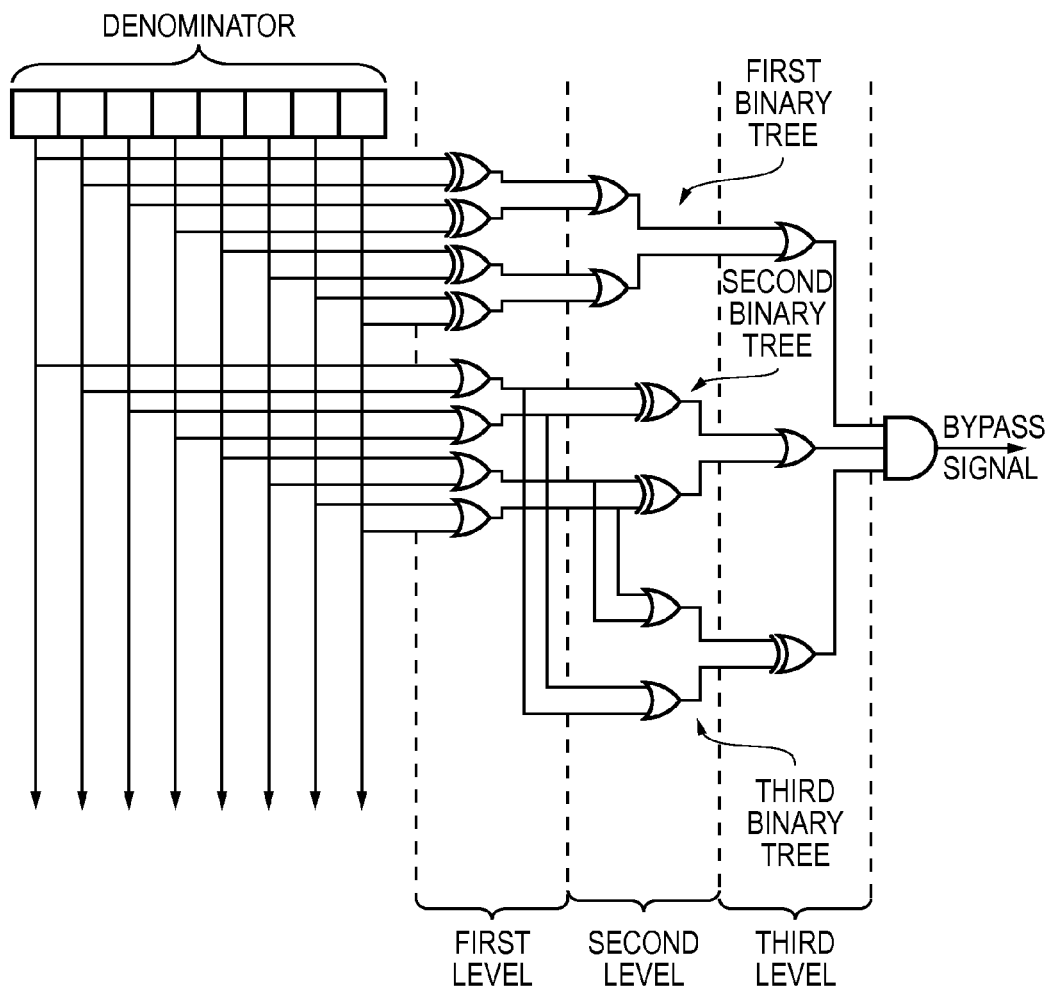
FIG. 5 schematically illustrates exclusive bit determination circuitry in one embodiment.

FIG. 5 schematically illustrates the configuration of logic gates in one embodiment used to provide the power-of-two detection circuitry. These logic gates comprise binary trees of two-input XOR and OR gates, together with a final AND gate which takes the output of each binary tree as its input. In other words, only if the three binary trees illustrated all generate a value of 1 is the exclusive bit condition determined (i.e. the denominator contains only one bit which is set) and the bypass signal is generated. As can be seen in FIG. 5, a first binary tree comprises XOR gates at a first level of its hierarchy, OR gates at a second level of its hierarchy and a single OR gate at the third level of its hierarchy. A second binary tree comprises OR gates at a first level of it hierarchy, XOR gates at a second level of its hierarchy and a final single OR gate at the third level of its hierarchy. The third binary tree comprises OR gates at the first level of its hierarchy, OR gates at the second level of its hierarchy, and a final XOR gate at the third level of its hierarchy. Hence, if the output of the first binary tree is set, this indicates that at least one bit is set in the denominator and this bit is exclusive with respect to its paired neighbour, i.e. its paired neighbour is not set. If the output of the second binary tree is set, this indicates that at least one bit is set in the denominator and the pair of bit locations in which this at least one bit is set is exclusive with respect to the pair of bit locations next to it, i.e. this adjacent pair of bits has no bits that are set. Finally, if the output of the third binary tree is set, this indicates that the other half of the denominator (four bits) from the half of the denominator in which at least one bit is set, does not contain any set bits. If all of these binary tree outputs are set, this indicates that only one bit is set within the denominator. Accordingly, the bypass signal is then generated.

Figure 6:
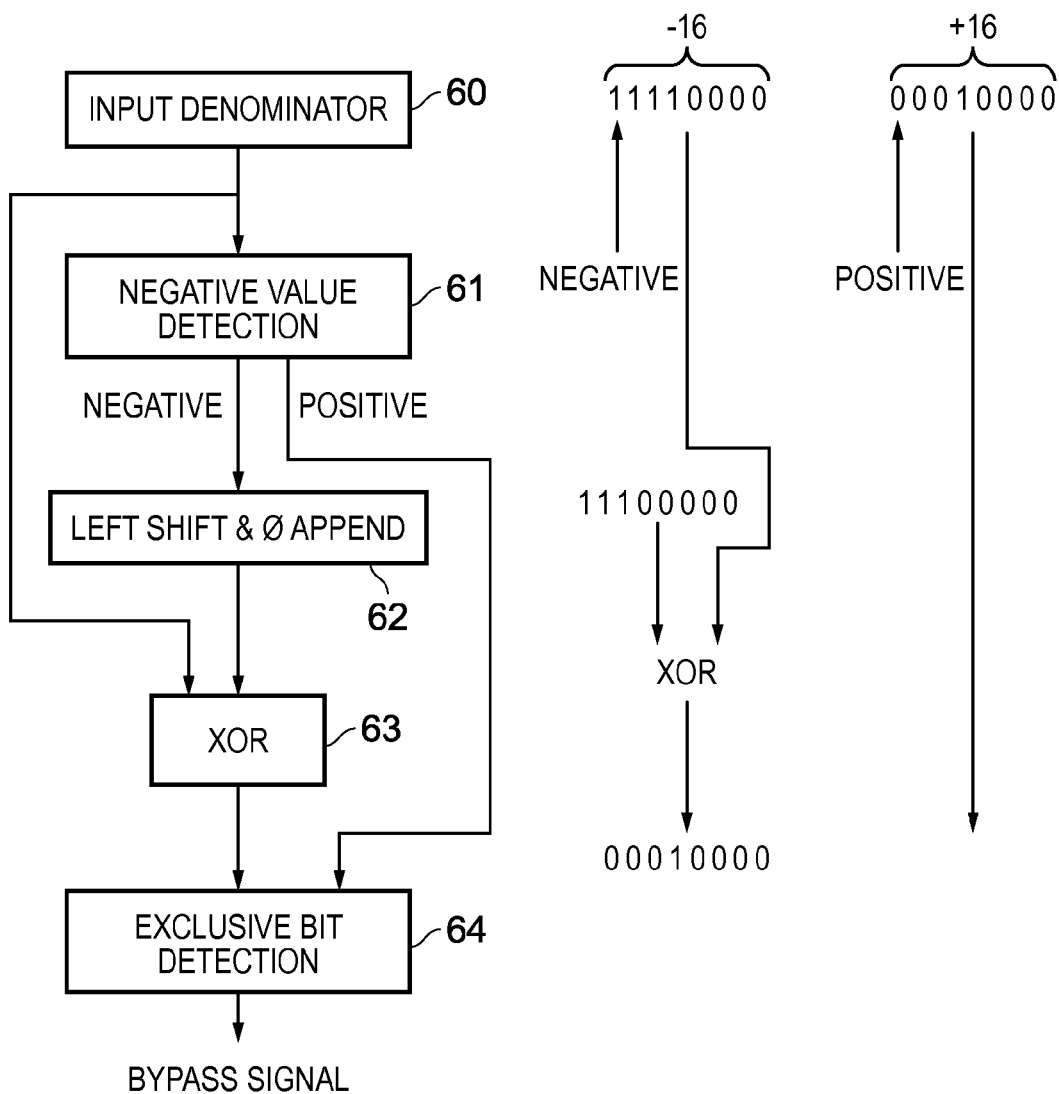
FIG. 6 schematically illustrates pre-processing circuitry which enables bath positive and negative signed integer input denominators (using two's complement representation) to be used as the input for the exclusive bit detection in one embodiment.

FIG. 6 schematically illustrates pre-processing circuitry which is provided in one embodiment which is configured to receive signed integers. An input denominator 60 is first passed to negative value detection circuitry 61, which is configured to determine whether the input denominator is a positive signed integer or a negative signed integer. As can be seen with reference to the example given on the right of FIG. 6, this is done with respect to the most significant bit of the input value which indicates whether the value is positive signed (zero) or negative signed (one). If the input denominator 60 is a positive signed integer then it may be passed directly to the exclusive bit detection circuitry 64, which may for example be configured as illustrated in FIG. 5. If however the negative value detection circuitry 61 determines that the input denominator 60 is a negative signed integer then the input denominator 60 is passed to the left shift and zero append circuitry 62, which is configured to left shift the negative signed input value by one bit position and to append a zero as the new least significant bit. This is also illustrated in the example shown on the right of FIG. 6. This newly generated value is then passed to the XOR circuitry 63, which takes the original input denominator value 60 as its other input. The result of this XOR operation is then passed to the exclusive bit detection circuitry 64.

As shown on the right of FIG. 6 a positive signed integer value, such as +16 (00010000), is passed directly to the exclusive bit detection circuitry 64, whereas a negative signed integer, such as −16 (11110000), is subjected to the described left shift, zero append and XOR process which generates a single set bit for negative signed input values which are a power-of-two. It will be noted that in the example given on the right of FIG. 6 the result of this operation on the negative signed integer is directly equivalent to the positive signed integer representation of this number (i.e. +16). However it should be noted that the left shift, zero append and XOR operation only generates the positive signed representation of a negative signed integer in the case where the negative signed integer is a power of two. In other cases the positive signed representation of the negative signed input integer does not result.

Figure 7:
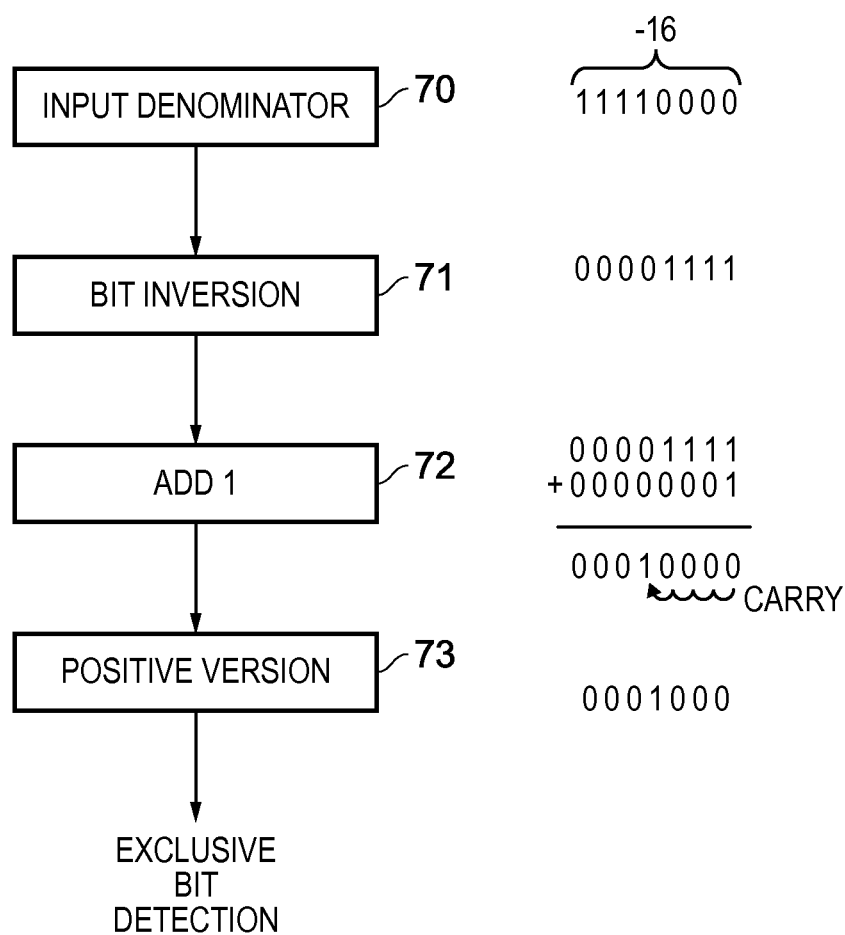
FIG. 7 schematically illustrates pre-processing circuitry which generates a positive equivalent of a negative signed integer input denominator in one embodiment.

However, converting a negative signed integer input denominator into its positive signed integer representation does represent another possibility for providing suitable input for the exclusive bit detection circuitry and in one embodiment, as schematically illustrated in FIG. 7, this inversion may be performed. Accordingly the input denominator 70 in this embodiment is first passed to bit inversion circuitry 71 which is configured to invert each of the bits of this value. Thereafter the addition circuitry 71 adds one to the result of that bit inversion process and this results in the positive version 73 of the input dominator 70. There can be situations in which this technique is desirable, for example when the bit inversion circuitry 71 and addition circuitry 72 are already provided within the data processing apparatus for other reasons. However, it should be recognised that a potential drawback of this particular technique is the associated processing that may be required to carry out the addition of one by the addition circuitry 72. This can be seen from the example given on the right of FIG. 7 where this addition requires multiple carry steps to be performed, which generally will consume greater time and energy to produce the positive version 73 than the technique described with reference to FIG. 6.

Figure 8:
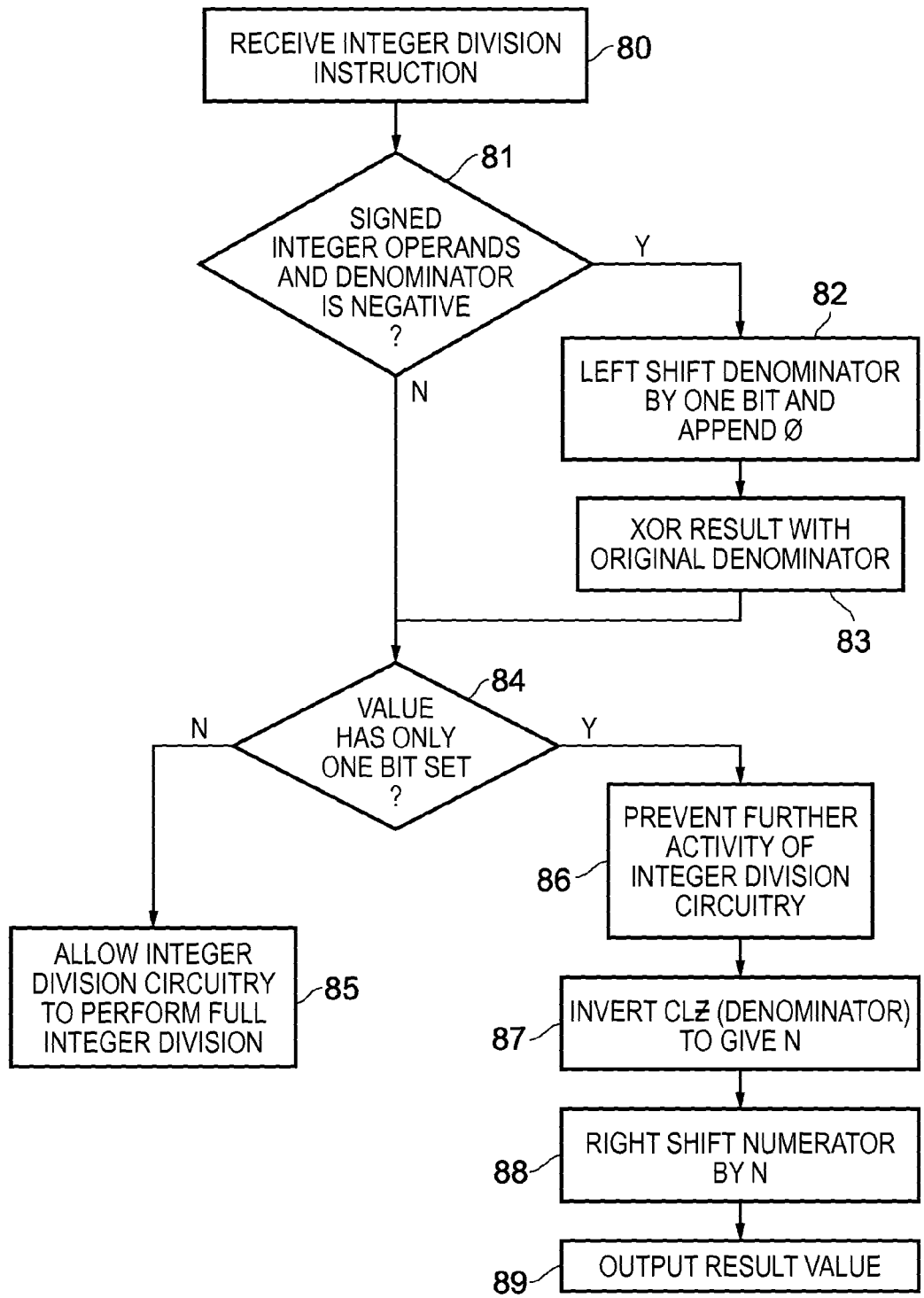
FIG. 8 schematically illustrates a sequence of steps which are taken in the method of one embodiment.

FIG. 8 schematically illustrates a sequence of steps which may be taken by the method of one embodiment. An integer division instruction is received at step 80 and interpreted, control signals being passed appropriately to set up the integer pipeline to carry out this instruction. Then at step 81, at a first step of executing this instruction, it is determined if the integer operands of this integer division to be carried out are signed integers and that the denominator value is negative. If this is the case then the flow proceeds via step 82 and 83 to step 84, whereas if this is not the case the flow proceeds directly to step 84. At step 82 the denominator is left shifted by one bit and a zero is appended at the least significant bit position. The result of this operation is XOR'd with the original denominator value at step 83 to generate a value which is passed to the next step. At step 84 it is determined if this value (i.e. the original denominator if the "No" path has been taken from step 81 or the result of the XOR operation at step 83) only has one bit set. If it does not, then the flow proceeds to step 85 where the integer division circuitry is allowed to perform its full integer division process to carry out the integer division instruction received at step 80. If however there is only one bit set, then the flow proceeds to step 86 where further activity of the integer division circuitry is prevented. At step 87 the CLZ value for the denominator is inverted to give N (i.e. the power-of-two to which the integer denominator corresponds) and at step 88 the numerator is right shifted by N bit positions. At step 89 the result is output as the result of the integer division instruction 80.

Figure 9:
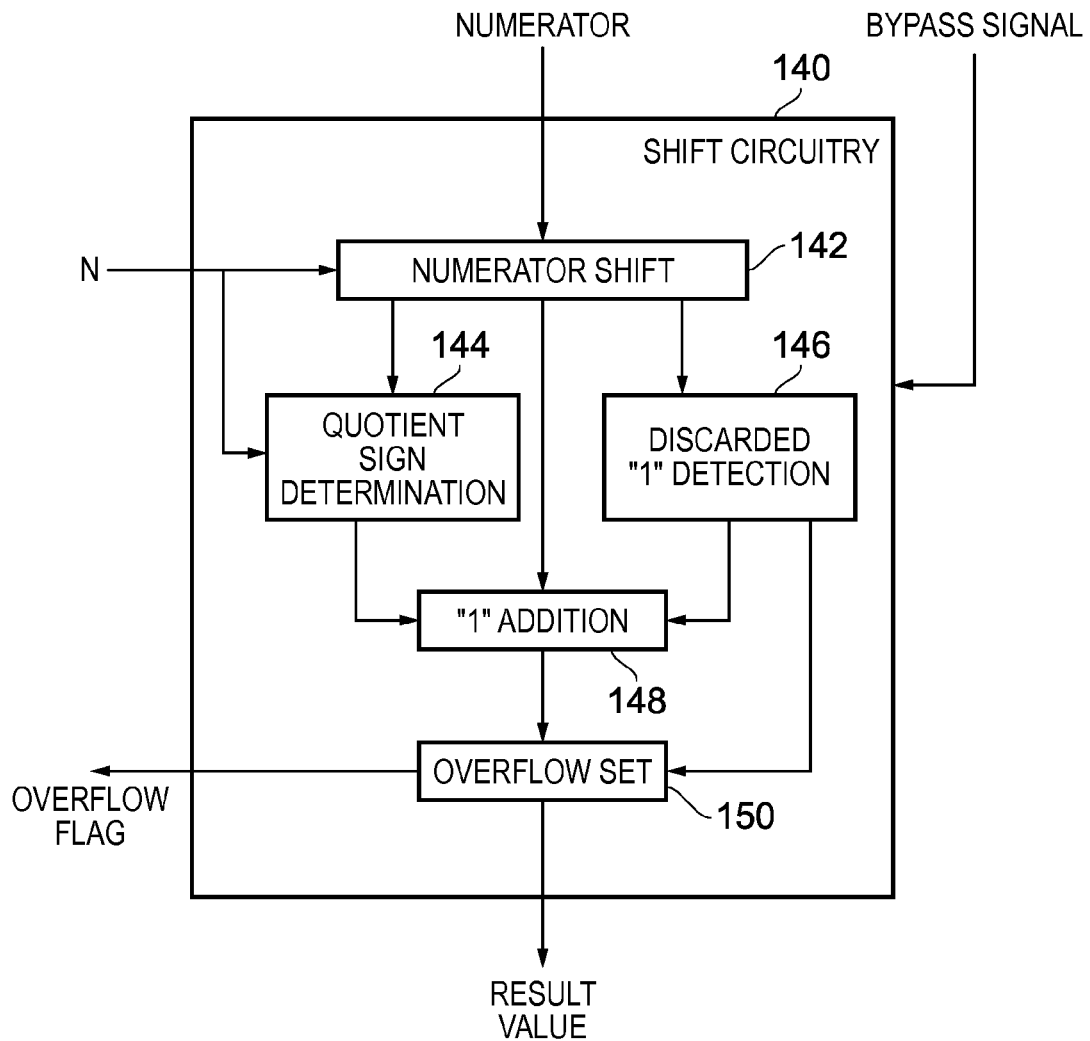
FIG. 9 schematically illustrates the configuration of shift circuitry in one embodiment.

FIG. 9 schematically illustrates more detail of the right shift circuitry 24/shift circuitry 124 shown in FIGS. 2A and 23. The shift circuitry is generically numbered 140 in FIG. 9 and could be applied to either embodiment. The shift circuitry 140 comprises numerator shift circuit 142, quotient sign determination circuit 144, discarded "1" detection circuit 146, "1" addition circuit 148 and overflow flag setting circuit 150. This particular configuration of the shift circuitry is provided to ensure that where the numerator is right shifted, the rounding of the result value is appropriately performed, in dependence on whether it is desired to round towards or away from zero, and where the numerator is left shifted, an overflow flag is set if the left shift results in a "1" being discarded.

For example, when the result of the division is a positive number, the result value after right shifting can be rounded towards zero. To take a simple example, where 11 is divided by 4, (true value 2¾) the "rounded towards zero" result is 2. In a binary implementation this is 11 (decimal)=01011 (binary), which after shifting by two places (to implement dividing by 4) gives 00010 and the "1" (the two least significant bits of the numerator) is discarded. However, when the result of the division is a negative number, implementing the same actions with respect to the result value after right shifting would result in rounding away from zero. Taking the negative version of the above example, −11 divided by 4=−2¾ would then come out as −3. This is because, in the binary representation, −11 (decimal)=10101 (2's complement binary), which after shifting by two places (dividing by 4) (and sign extending) gives 11101 and the trailing "01" (the two least significant bits of the numerator) is discarded.

In order to provide a configuration in which the direction of rounding is consistent (either towards or away from zero), the shift circuitry is provided with the quotient sign determination circuit 144, discarded "1" detection circuit 146 and "1" addition circuit 148. The quotient sign determination circuit 144 determines the sign of the quotient that results from the operation of the numerator shift circuit 142. The discarded "1" detection circuit 146 determines if, as a result of a right shift operation, at least one set bit (i.e. "1" in this embodiment) has been discarded. On the basis of the results of the operation of the quotient sign determination circuit 144 and discarded "1" detection circuit 146, the discarded "1" detection circuit controls the "1" addition circuit 148 to add a "1" to the result value to ensure that the rounding is correctly carried out. In particular if the apparatus is configured to round towards zero, if any ones are shifted out and the quotient is negative, the "1" addition circuit 148 adds a "1" to the result value. Conversely, if the apparatus is configured to round away from zero, if any ones are shifted out and the quotient is positive, the "1" addition circuit 148 adds a "1" to the result value.

In another example, the numerator is left shifted by the numerator shift circuit 142. The discarded "1" detection circuit 146 determines whether, as a result of the left shift operation, at least one set bit has been discarded. If the discarded "1" detection circuit determines that at least one set bit has been discarded, it controls the overflow flag setting circuit 150 to set an overflow flag. In this embodiment the result value is not affected by the assertion of the overflow flag (although it will be invalid as not representing the true value of the result of the division). As mentioned above, however, the result value could instead, for example, be set to a maximum value representable by the data processing system.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. Apparatus for data processing configured to respond to a division instruction to perform a division operation, wherein the division operation is arranged to generate a result value by dividing an input numerator specified by the division instruction by an input denominator specified by the division instruction, wherein the input numerator and input denominator are binary values, the apparatus comprising:
  division circuitry configured to generate the result value by carrying out the division operation;
  power-of-two detection circuitry configured to signal a bypass condition if the input denominator has a value given by $\pm 2^N$, where N is an integer;
  bypass circuitry configured, in response to signalling of the bypass condition, to cause the division circuitry to be bypassed and to cause the result value to be generated as the input numerator shifted by N bits, and
  leading zero determination circuitry configured to determine a leading zero count of the input denominator, wherein the power-of-two detection circuitry is configured to determine N from the leading zero count of the input denominator by inverting a binary representation of the leading zero count.

2. The apparatus as claimed in claim 1, wherein the power-of-two detection circuitry includes exclusive bit detection circuitry configured to signal the bypass condition if the input denominator has only one bit set while all other bits are unset.

3. The apparatus as claimed in claim 2, wherein the bypass circuitry is configured to cause the result value to be generated as the input numerator shifted by a number of unset bits which follow the one bit set in the input denominator.

4. The apparatus as claimed in claim 1, wherein the input numerator and input denominator are unsigned binary values.

5. The apparatus as claimed in claim 1, wherein the input numerator and input denominator are signed binary values using two's complement representation and the power-of-two detection circuitry comprises pre-processing circuitry configured to pre-process the input denominator to generate a pre-processed input denominator if the input denominator has a negative value, and the power-of-two detection circuitry is configured to detect the bypass condition if the pre-processed input denominator represents a power of two.

6. The apparatus as claimed in claim 5, wherein the pre-processing circuitry is configured to generate a positive equivalent of the input denominator as the pre-processed input denominator.

7. The apparatus as claimed in claim 6, wherein the pre-processing circuitry is configured to invert the bits of the input denominator and add one to generate the pre-processed input denominator.

8. The apparatus as claimed in claim 1, wherein the input numerator and input denominator are binary integers.

9. The apparatus as claimed in claim 1, wherein the input numerator and input denominator are fixed-point binary values.

10. The apparatus as claimed in claim 9, wherein the bypass circuitry is configured, when the power-of-two detection circuitry indicates that N is a negative integer, to cause the result value to be generated as the input numerator left shifted by N bits.

11. The apparatus as claimed in claim 1, wherein the bypass circuitry is configured, when the power-of-two detection circuitry indicates that N is a positive integer, to cause the result value to be generated as the input numerator right shifted by N bits.

12. Apparatus for data processing configured to respond to a division instruction to perform a division operation, wherein the division operation is arranged to generate a result value by dividing an input numerator specified by the division instruction by an input denominator specified by the division instruction, wherein the input numerator and input denominator are binary values, the apparatus comprising:
   division circuitry configured to generate the result value by carrying out the division operation;
   power-of-two detection circuitry configured to signal a bypass condition if the input denominator has a value given by $\pm 2^N$, where N is an integer;
   bypass circuitry configured, in response to signalling of the bypass condition, to cause the division circuitry to be bypassed and to cause the result value to be generated as the input numerator shifted by N bits, and
   trailing zero determination circuitry configured to determine a trailing zero count of the input denominator, wherein the power-of-two detection circuitry is configured to determine N as the trailing zero count of the input denominator.

13. Apparatus for data processing configured to respond to a division instruction to perform a division operation, wherein the division operation is arranged to generate a result value by dividing an input numerator specified by the division instruction by an input denominator specified by the division instruction, wherein the input numerator and input denominator are binary values, the apparatus comprising:
   division circuitry configured to generate the result value by carrying out the division operation;
   power-of-two detection circuitry configured to signal a bypass condition if the input denominator has a value given by $\pm 2^N$, where N is an integer;
   bypass circuitry configured, in response to signalling of the bypass condition, to cause the division circuitry to be bypassed and to cause the result value to be generated as the input numerator shifted by N bits,
   wherein the power-of-two detection circuitry includes exclusive bit detection circuitry configured to signal the bypass condition if the input denominator has only one bit set while all other bits are unset, and
   wherein the exclusive bit detection circuitry comprises plural binary trees of gates, each binary tree of gates comprising a plurality of hierarchical levels, wherein one hierarchical level of each binary tree comprises XOR gates while all other hierarchical levels of each binary tree comprise OR gates,
   and each binary tree of the plural binary trees has its XOR gates at a different hierarchical level to the other binary trees of the plural binary trees,
   and an AND combination of outputs of the plural binary trees is indicative of the bypass condition.

14. Apparatus for data processing configured to respond to a division instruction to perform a division operation, wherein the division operation is arranged to generate a result value by dividing an input numerator specified by the division instruction by an input denominator specified by the division instruction, wherein the input numerator and input denominator are binary values, the apparatus comprising:
   division circuitry configured to generate the result value by carrying out the division operation;
   power-of-two detection circuitry configured to signal a bypass condition if the input denominator has a value given by $\pm 2^N$, where N is an integer;
   bypass circuitry configured, in response to signalling of the bypass condition, to cause the division circuitry to be bypassed and to cause the result value to be generated as the input numerator shifted by N bits,
   wherein the power-of-two detection circuitry includes exclusive bit detection circuitry configured to signal the bypass condition if the input denominator has only one bit set while all other bits are unset, and
   wherein the exclusive bit detection circuitry comprises a network of logic gates, the network of logic gates configured to take the input denominator as a test value and to:
   A) perform a determination of whether no bits are set in a first half of the bits of the test value and at least one bit is set in a second half of the bits of the test value, and if the determination is true, to:
   B) take the second half of the bits of the test value as the test value and repeat the determination at A), until the second half of the bits of the test value is only one bit, and if this one bit is set to signal the bypass condition.

15. Apparatus for data processing configured to respond to a division instruction to perform a division operation, wherein the division operation is arranged to generate a result value by dividing an input numerator specified by the division instruction by an input denominator specified by the division instruction, wherein the input numerator and input denominator are binary values, the apparatus comprising:
   division circuitry configured to generate the result value by carrying out the division operation;

power-of-two detection circuitry configured to signal a bypass condition if the input denominator has a value given by $\pm 2^N$, where N is an integer; and bypass circuitry configured, in response to signalling of the bypass condition, to cause the division circuitry to be bypassed and to cause the result value to be generated as the input numerator shifted by N bits, wherein the input numerator and input denominator are signed binary values using two's complement representation and the power-of-two detection circuitry comprises pre-processing circuitry configured to pre-process the input denominator to generate a pre-processed input denominator if the input denominator has a negative value, and the power-of-two detection circuitry is configured to detect the bypass condition if the pre-processed input denominator represents a power of two, and wherein the pre-processing circuitry is configured to left shift the input denominator by one bit and append an unset bit as a least significant bit to generate an intermediate value, and is configured to XOR the intermediate value with the input denominator to generate the pre-processed input denominator.

16. The apparatus as claimed in claim 15, wherein the power-of-two detection circuitry is configured to detect a bypass condition if the pre-processed input denominator has only one bit set while all other bits are unset.

17. Apparatus for data processing configured to respond to a division instruction to perform a division operation, wherein the division operation is arranged to generate a result value by dividing an input numerator specified by the division instruction by an input denominator specified by the division instruction, wherein the input numerator and input denominator are binary values, the apparatus comprising:

division circuitry configured to generate the result value by carrying out the division operation; and power-of-two detection circuitry configured to signal a bypass condition if the input denominator has a value given by $\pm 2^N$, where N is an integer; and bypass circuitry configured, in response to signalling of the bypass condition, to cause the division circuitry to be bypassed and to cause the result value to be generated as the input numerator shifted by N bits, and result modification circuitry configured, when the bypass condition is signalled, to identify a truncation condition if right shifting the input numerator by N bits to generate the result value has removed at least one set bit and, when the truncation condition is true, to cause a set least significant bit value to be added to the result value.

18. The apparatus as claimed in claim 17, wherein the result modification circuitry is configured to require that the result value is negative to identify the truncation condition to be true.

19. The apparatus as claimed in claim 17, wherein the result modification circuitry is configured to require that the result value is positive to identify the truncation condition to be true.

* * * * *